(12) United States Patent
Roth et al.

(10) Patent No.: US 10,596,768 B2
(45) Date of Patent: Mar. 24, 2020

(54) METHOD OF PRODUCING A FIBER COMPOSITE COMPONENT

(71) Applicant: Airbus Operations GmbH, Hamburg (DE)

(72) Inventors: Ingo Roth, Hamburg (DE); Marc Fette, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 248 days.

(21) Appl. No.: 15/701,201

(22) Filed: Sep. 11, 2017

(65) Prior Publication Data

US 2018/0072004 A1   Mar. 15, 2018

(30) Foreign Application Priority Data

Sep. 12, 2016 (DE) .................. 10 2016 117 103

(51) Int. Cl.
*B29C 70/08* (2006.01)
*B32B 3/08* (2006.01)
(Continued)

(52) U.S. Cl.
CPC .......... *B29C 70/081* (2013.01); *B29C 70/026* (2013.01); *B29C 70/345* (2013.01);
(Continued)

(58) Field of Classification Search
CPC ........ B29C 70/42; B29C 70/44; B29C 70/46; B29C 70/541; B29C 70/74; B29C 70/84; B29C 70/845
See application file for complete search history.

(56) References Cited

U.S. PATENT DOCUMENTS 5,356,588 A * 10/1994 Hara ................. B29C 45/14786
264/257
5,851,336 A   12/1998 Cundiff et al.
(Continued)

FOREIGN PATENT DOCUMENTS

DE        10059801 A1   6/2002
DE    102010050969 A1   5/2012
EP        2497624 A2    9/2012

OTHER PUBLICATIONS

German Patent and Trade Mark Office, Search Report in German Patent Application No. 10 2016 117 103.4 dated Feb. 10, 2017.

*Primary Examiner* — Benjamin A Schiffman
(74) *Attorney, Agent, or Firm* — Lorenz & Kopf LLP (57) ABSTRACT

A method for producing a fiber composite component includes a step (a) that includes a production of a semi-finished product by: providing a core layer having cavities; covering an outer face of the core layer with a layer-shaped semi-finished product having continuous fibers pre-impregnated with a first duroplastic matrix material; and applying a molding compound to a first deposit area of a front face of the first semi-finished product, the front face facing away from the core layer, wherein the molding compound includes a second long-fiber-reinforced duroplastic matrix material. The method also includes a step (b) for extruded reshaping of the semi-finished product to the fiber composite component. The extruded reshaping is performed at an operating temperature, and the first and the second matrix material are configured such that flowability of the second matrix material is higher than flowability of the first matrix material during the reshaping.

16 Claims, 4 Drawing Sheets

(51) Int. Cl.

| | | |
|---|---|---|
| *B32B 5/24* | (2006.01) | |
| *B32B 27/30* | (2006.01) | |
| *B29C 70/02* | (2006.01) | |
| *B32B 27/36* | (2006.01) | |
| *B32B 5/18* | (2006.01) | |
| *B32B 3/30* | (2006.01) | |
| *B32B 27/42* | (2006.01) | |
| *B32B 27/38* | (2006.01) | |
| *B32B 5/02* | (2006.01) | |
| *B32B 27/06* | (2006.01) | |
| *B29C 70/34* | (2006.01) | |
| *B29C 70/46* | (2006.01) | |
| *B29C 70/68* | (2006.01) | |
| *B32B 3/12* | (2006.01) | |

(52) U.S. Cl.
CPC .............. *B29C 70/46* (2013.01); *B29C 70/68* (2013.01); *B32B 3/08* (2013.01); *B32B 3/12* (2013.01); *B32B 3/30* (2013.01); *B32B 5/028* (2013.01); *B32B 5/18* (2013.01); *B32B 5/245* (2013.01); *B32B 27/065* (2013.01); *B32B 27/30* (2013.01); *B32B 27/308* (2013.01); *B32B 27/36* (2013.01); *B32B 27/38* (2013.01); *B32B 27/42* (2013.01); *B32B 2250/03* (2013.01); *B32B 2250/40* (2013.01); *B32B 2255/02* (2013.01); *B32B 2255/26* (2013.01); *B32B 2260/021* (2013.01); *B32B 2260/046* (2013.01); *B32B 2266/06* (2013.01); *B32B 2266/08* (2013.01); *B32B 2307/54* (2013.01); *B32B 2307/734* (2013.01)

(56) References Cited

U.S. PATENT DOCUMENTS

| | | | |
|---|---|---|---|
| 8,365,502 B2* | 2/2013 | Allen | B29C 66/81455 403/265 |
| 8,414,724 B2* | 4/2013 | Allen | B29C 66/1162 156/172 |
| 8,713,895 B2* | 5/2014 | Allen | B29C 66/1162 403/265 |
| 8,784,596 B2* | 7/2014 | Hand | B29C 70/46 156/245 |
| 9,505,204 B2* | 11/2016 | Hand | B29C 70/46 |
| 2005/0255311 A1* | 11/2005 | Formella | B29C 70/46 428/323 |
| 2016/0114526 A1* | 4/2016 | Inoh | B29C 70/46 264/257 |
| 2017/0247115 A1* | 8/2017 | Mandel | B29C 65/562 |

* cited by examiner

METHOD OF PRODUCING A FIBER COMPOSITE COMPONENT

CROSS-REFERENCE TO PRIORITY APPLICATION

This application claims the benefit of, and priority to, German patent application number 10 2016 117 103.4, filed Sep. 12, 2016.

TECHNICAL FIELD

Embodiments of the subject matter described herein relate to a method for producing a fiber composite component.

BACKGROUND

Fiber composite components are generally known from the prior art. A fiber composite component may be designed according to a so-called sandwich component. For producing a sandwich component, first a porous core layer is provided. Then, a covering by a fiber-reinforced material layer is provided on each oppositely arranged outer faces of the core layer. The resulting semi-finished composite product is then provided to a pressing device, in which the semi-finished composite product is pressed to a desired shape under the influence of a predetermined pressure and a predetermined temperature, wherein at the same time a hardening of the fiber-reinforced material layers happens. The shaping of the outer contour happens by extruded reshaping. In doing so, matrix material of the fiber-reinforced cover layer flows into cavities of the pressing device. To enable that, it is practice to often use very short or short fibers for the fiber reinforcement, respectively. Short fibers for a fiber-reinforced matrix material have the disadvantage, that they ensure a lower tensile strength and/or bending stiffness, when the fiber-reinforced material layers are hardened by the pressing device. If continuous layers are used instead of short layers, that disadvantage may be overcome, but during the extruded reshaping this will result in that substantially only the matrix material and not the fibers will flow into the cavities of the pressing device. Also, a component which is produced in that manner will usually not provide the desired stability, at least in those regions, which protrude over the outer surface and which correspond to the cavities of the pressing device.

BRIEF SUMMARY

Provided here is a method for producing a fiber composite component such that the fiber composite component comprises a specifically high shape stability and/or shape stiffness. Preferably, the fiber composite component shall comprise a geometrically complex outer contour and/or shall serve as a functional component.

According to a first aspect of the disclosed subject matter, certain objectives are met by a method for producing a fiber composite component, wherein the method is designed according to claim 1. Preferred embodiments of the method and/or advantageous features of the method are described in the dependent claims and/or in the following description.

Therefore, a method for producing a fiber composite component is provided. According to a first step a) of the method, the production of a semi-finished composite product is provided. The production of the semi-finished composite product is structured in at least the following sub-steps i) and iii). According to sub-step i), a provisioning of a core layer is provided, which comprises a plurality of cavities. According to a further sub-step ii), a covering of a first outer face of the core layer with a layer-shaped semi-finished product is provided, which comprises continuous fibers being pre-impregnated with a first duroplastic matrix material. According to a further sub-step iii), an applying of a first molding compound to a first, predetermined deposit area of a front face of the first semi-finished product is provided. In doing so, the front face of the first semi-finished product faces away from the core layer. The first molding compound comprises a second, long-fiber-reinforced, duroplastic matrix material. When all sub-steps are performed, a semi-finished composite product is created. According to a further step b) of the method for producing a fiber composite component, an extruded reshaping of the semi-finished composite product to a fiber composite product is provided. In doing so, the extruded reshaping is performed at a, preferably predetermined, operating temperature. The first and the second matrix material are carried out such that a flowability of the second matrix material is higher than the flowability of the first matrix material during the extruded reshaping.

The first layer-shaped semi-finished product which is also referred to as first semi-finished product is therefore arranged on the first outer face of the core layer. In doing so, the first semi-finished product may cover a portion of the first outer face of the core layer or the complete first outer face of the first semi-finished product. The core layer and the first semi-finished product may form layers of the semi-finished composite product. At least a first molding compound is applied on a front face of the first semi-finished product. The molding compound covers only a deposit area of the front face of the first semi-finished product. Thus, the first molding compound may for example only cover a sub area of the front face of the first semi-finished product. A particular advantage of the semi-finished composite product may be that different fibers, in particular fibers of different length, may be used for the first semi-finished product and for the compound mold. The first semi-finished product is characterized in by the continuous fibers which are pre-impregnated by a duroplastic matrix material. The molding compound on the other hand comprises a duroplastic matrix material in which long fibers are embedded as reinforcement.

For producing the fiber composite component in step b) an extruded reshaping of the semi-finished composite product to a fiber composite component is performed. The continuous fibers of the first semi-finished product may form an internal composite due to the duroplastic matrix materials with which they are impregnated. The first semi-finished product may therefore comprise a limited flowability. The long fibers which are embedded into the duroplastic matrix material of the molding compound may also form a composite due to said duroplastic matrix material but due to their shorter length, the composite is not as strongly pronounced as in the first semi-finished product. The molding compound is therefore better suited for forming the desired outer shape of the fiber composite component, particularly the associated protrusions. Therefore, it is provided that at least during the extruded reshaping the flowability of the second matrix material of the first molding compound is higher than the flowability of the first matrix material of the first semi-finished product. If the extruded reshaping is performed at a, preferably predetermined, operating temperature, the second matrix material of the molding compound can flow earlier and/or faster than the first matrix material of the first semi-finished product. In doing so, it is preferred, that at least substantially only the second matrix material of the molding compound flows during the extruded reshaping. The first and/or the second matrix material may be accordingly carried out. If the second matrix material flows during the extruded reshaping of the semi-finished composite product to the fiber composite component the protrusions and/or protruding component sections of the fiber composite component are formed at least in part or completely by the hardened first molding compound. In doing so, the first molding compound may flow into the corresponding grooves and undercut areas and/or further geometric complex shaping areas of a pressing tool to ensure the respective shaping of the fiber composite component. While the second matrix material of the first molding compound flows, the long fibers of the first molding compound may flow with the second matrix material, since the long fibers have a significantly shorter length than the continuous fibers of the first semi-finished product. Since either the first semi-finished product as well as the first molding compound comprise duroplastic material, a cross-linking between the first molding compound and the first semi-finished product may develop during the extruded reshaping, such that a respective cross-linking develops in the fiber composite component.

During the extruded reshaping of the semi-finished fiber composite product to the fiber composite component it may be provided that the core layer remains substantially preserved and/or unchanged. The core layer can be formed from a hard foam and/or from an alveolar cavity and/or the cavities can be formed in the foam.

The first semi-finished product can preferably be formed as a so-called prepreg. Furthermore, the first matrix material of the first semi-finished product may be partially hardened and/or partially cross-linked. Preferably, the second matrix material is in a transition phase between a liquid phase and a solid phase in sub-step ii). Thus, the second matrix material can be a partially cross-linked and/or partially hardened duroplastic material with which the continuous fibers of the first semi-finished product are impregnated. The first semi-finished product may comprise a portion of the fiber volume of at least 40%, at least 50% or at least 60%. Furthermore, it can be provided that the continuous fibers of the first semi-finished product comprise an average fiber length of at least 50 mm or at least 80 mm. Furthermore, it can be provided, that the continuous fibers are characterized in that the continuous fibers extend completely in the first semi-finished product.

Preferably, the first molding compound is formed from a so-called Sheet Molding Component (SMC). The first molding compound may be formed from a long-fiber-reinforced duroplastic resin material. The long fibers of the first molding compound may for example comprise an average fiber length of at the most 40 mm, at the most 30 mm or at the most 20 mm. Furthermore, the long fibers may comprise an average fiber length of 10 to 50 mm, preferably from 10 mm to 25 mm. Is preferred that the average fiber length of the long fibers of the first molding compound is at least 20 mm or at least 30 mm shorter than an average fiber length of the continuous fibers of the first semi-finished product. This ensures, that the first molding compound is easier and/or faster deformable as the first semi-finished product, in particular during the extruded reshaping. Therefore, it is particularly preferred that the first molding compound may be configured to stamp at least a component section of the fiber composite component which protrudes from the outer face. This is particularly an advantage if said component section comprises a particularly complex geometric structure and/or outer shape. The second matrix material of the first molding compound is preferably a partially hardened and/or partially cross-linked duroplastic material. Preferably, the first molding compound or the corresponding second matrix material is in a transition phase between a liquid phase and solid phase in sub-step iii), respectively. The first molding compound therefore can be carried out in a pasty manner. Furthermore, it can be provided that the first molding compound comprises a fiber volume portion of at the most 50%, at the most 40% or at the most 30%. Due to the limited average fiber length and/or due to the limited fiber volume portion of the first molding compound it can be ensured that the first molding compound comprises a better flow property than the first semi-finished product.

For the continuous fibers mentioned before and/or the long fibers it is preferred that those are carried out as glass fibers, carbon fibers and/or aramid fibers.

The first and/or the second duroplastic matrix material may each for example be based on a duromere or duroplastic reactive resin, respectively, like for example polyester resin, vinylester resin, phenol resin and/or epoxy resin. A phenolplast, an aminoplast, a polyacrylate and/or an epoxy resin may for example be used as first and/or the second duroplastic matrix material.

According to an advantageous embodiment, it is provided that the flowability is defined by the duration in which the first or the second matrix material is flowable during the extruded reshaping, respectively, in particular due to the influence of the operating temperature. Furthermore, it can be provided, that the flowability of the first or the second matrix material, respectively, is understood reciprocally to a viscosity of the first matrix material or the second matrix material, respectively. Whilst the flowability of the second matrix material is higher than the flowability of the first matrix material during the extruded reshaping it can be ensured that during the extruded reshaping, the first molding compound will firstly and/or primarily flow. Preferably, the first and/or the second matrix material is flowable if it is liquid and/or viscous. Thus, during the extruded reshaping, the molding compound can at first flow into convex interiorly protruding cavity regions of the pressing tool, wherein the pressing tool is configured to stamp a complex outer shape of the fiber composite component. A better flowability of the second matrix material at least during the extruded reshaping avoids therefore that during the extruded reshaping the second matrix material and/or the first semi-finished product, respectively, will flow into the cavity areas mentioned above, in which preferably the first molding compound shall flow. When the flowing of the second matrix material of the first molding compound starts, the long fibers being embedded therein will go along with it and/or they will stream with it, such that a disadvantageous and/or an uneven distribution of the long fibers in the flowable first molding compound may be prevented. Generally, a, particularly very slight, flow of the first matrix material of the first semi-finished product may occur. Since the above-mentioned cavity areas of the pressing tool are filled at least substantially with the first molding compound, the flowing of the first matrix material of the first semi-finished product is limited to very short distances. This ensures a desired distribution of the continuous fibers which may be predetermined by the covering of the outer face of the core layer of the first semi-finished product. Thus, the fiber composite component to be produced may comprise a predetermined and/or advantageous arrangement of continuous fibers which positively influence the shape stability and/or the stiffness of the fiber composite component.

Due to the extruded reshaping of the first semi-finished composite product to the fiber composite component the desired outer shape is stamped on the semi-finished composite product, the outer shape corresponding to the desired outer shape of the fiber composite component. As discussed above, the first molding compound will flow during the extruded reshaping. At least, the extruded reshaping ensures a hardening of the first molding compound and the first semi-finished product. The hardening may result from the, particularly predetermined, operating temperature and/or from an outer pressure on the semi-finished composite product. The hardening can therefore comprise a further cross-linking and/or a complete cross-linking of the first matrix material and/or the second matrix material.

The fiber composite component being generated by the extruded reshaping of the semi-finished composite product is particularly stable and at the same time particularly light. The reason is that the core layer with the corresponding cavities comprises a particularly low weight. Due to the hardening of the first semi-finished product and the first molding compound a particularly dimensionally stable layer of the first composite component is formed. During the extruded reshaping, the second matrix material of the molding compound and the first matrix material of the first semi-finished product may cross-link such that a one-piece layer is generated by the first semi-finished product and for the first molding compound. This layer ensures a particularly high tensile strength and/or bending stiffness. Furthermore, in practice it has been found that such a layer is particularly shock-resistant.

An advantageous embodiment of the method is characterized in that the operating temperature is higher than a second flow temperature at which the second matrix material starts becoming flowable, wherein the first flow temperature at which the first matrix material starts becoming flowable is higher than the second flow temperature of the second matrix material. The first flow temperature of the first matrix material may therefore be higher than the second flow temperature of the second matrix material. The matrix materials may be correspondingly designed. This can be ensured by a predetermined choice of the corresponding resin materials and/or by a predetermined choice of additives. Furthermore, the matrix materials may be formed such that the operating temperature is higher than the first flow temperature and higher than the second flow temperature. If the operating temperature acts on the semi-finished composite product during the extruded reshaping, the second matrix material of the first molding compound will reach the corresponding second flow temperature first. Thus, the second matrix material of the first molding compound will be flowable. Since the first flow temperature of the first matrix material of the first semi-finished product is higher than the second flow temperature of the second matrix material of the first molding compound a flowable state of the first matrix material will be achieved after a respective flowable state of the second matrix material. During the extruded reshaping, it can therefore be ensured that first the first molding compound flows and afterwards the flowing of the second semi-finished product will happen. The time shift between the flowing of the first molding compound and the first semi-finished product can for example amount to at least a quarter of the second or at least a second. Therefore, while the extruded reshaping forms of the semi-finished composite product to the fiber composite component, particularly complex outer component sections of the fiber composite component may be formed by the hardened first molding compound. Furthermore, it can be provided, that the flowability of a matrix material is defined by a reciprocal value of the flow temperature of the respective matrix material.

A further advantageous embodiment of the method is characterized in that during the extruded reshaping, the second matrix material is carried out such that the second matrix material transitions within a second transition time from a plastically deformable state to a flowable state, wherein during the extruded reshaping, the first matrix material transitions within a first transition time from a plastically deformable state to a flowable state, and wherein the first transition time is longer by at least 20% than the second transition time. A transition time is particularly characterized by a time duration. For transitioning the second matrix material of the first molding compound from a plastically deformable state in a flowable state, a time duration, namely the second transition time, is necessary during the extruded reshaping. That time duration is smaller than the time duration, namely the first transition time, which is necessary for the respective status transition of the first matrix material of the first semi-finished product. The second matrix material of the first molding compound reaches the flowable state during the extruded reshaping therefore before the first matrix material of the first semi-finished product. Therefore, the first molding compound can flow in to the cavities of a pressing tool during the extruded reshaping, which stamp particularly complex outer contours and/or outer shapes of the fiber composite component. The flowing of the first molding compound into said cavities can take place within a delay time in which the second matrix material of the first molding compound already is in a flowable state and within which the first matrix material of the first semi-finished product is not yet in the flowable state.

Preferably, the plastically deformable state of a matrix material is defined by that the respective matrix material is soft and/or not dimensionally stable, but not yet liquid or viscous. Therefore, the respective matrix material may be plastically deformed and plastically deformable. For the semi-finished composite product and/or the corresponding sub-steps it is preferred that the first matrix material and/or the second matrix material are in the plastically deformable state. Furthermore, it can be preferred that the plastically deformable state of a matrix material is defined by that a respective matrix material is pasty. The respective matrix material may therefore be in a state between solid and liquid.

Preferably, the flowable state of a matrix material is defined by that a respective matrix material is liquid or viscous. Then, the respective matrix material may flow in a flowable state. Furthermore, it can be preferred that the flowability of a matrix material is defined by a reciprocal value of the corresponding transition time.

Although the previous explanation is in general discussed for a matrix material, corresponding properties and/or preferred features may be applied to the first matrix material and/or the second matrix material in an analogous manner.

An advantageous embodiment of the method is characterized in that the extruded reshaping is performed within a process duration, wherein the process duration is longer than the first transition time and/or shorter than the second transition time. In doing so, the second matrix material is carried out such, that during the extruded reshaping it transitions within the previously mentioned second transition time from a plastically deformable state to a flowable state. The first matrix material of the first semi-finished product is preferably carried out such that during the extruded reshaping it would transition from a plastically deformable state into a flowable state if the extruded reshaping is performed for a period which is longer than the first transition time, wherein the first matrix material would then transition from said plastically deformable state to the flowable state. As it has been previously stated to be a preferable embodiment, the extruded reshaping is carried out within a process duration. The extruded reshaping may then be limited by the process duration. Since the process duration is preferably longer than the second transition time, the state transition of the second matrix material of the first molding compound occurs. During the extruded reshaping, the second matrix material of the first molding compound will transition to the flowable state. Furthermore, it is preferred, that the process duration for the extruded reshaping is shorter than the first transition time, the first transition time being necessary to transition the first matrix material of the first semi-finished product from the plastically deformable state to the flowable state. Since the extruded reshaping is limited to the said process duration, the first transition time will not be reached. A transition to the liquid state of the first matrix material of the first semi-finished product will therefore preferably not occur. Thus, the first matrix material of the first semi-finished product will not become flowable. However, it is possible, that the first matrix material of the first semi-finished product or the first semi-finished product as such, respectively, is shaped during the extruded reshaping. In doing so, a relative assignment of the continuous fibers to the core layer may at least substantially be preserved. This ensures a particularly high and pre-determinable stability of the fiber composite component to be produced.

A further advantageous embodiment of the method is characterized in that the continuous fibers of the first molding compound are formed by a fiber fabric or a fiber scrim. This provides the advantage that the continuous fibers may comprise a particularly advantageous distribution to each other and/or a particularly advantageous cross-link within each other. When the first semi-finished product for producing the fiber composite component is hardened, an accordingly stiff and/or dimensionally stable layer of the fiber composite component may develop. This layer may absorb particularly high forces and/or moments wherein a destruction of the fiber composite component is avoided.

A further advantageous embodiment of the method is characterized in that the long fibers of the first molding compound are arranged and/or embedded randomly in the second matrix material. For that, the long fibers may be quasi-isotropically distributed or embedded in the second matrix material of the first molding compound. If during the extruded reshaping the second matrix material of the molding compound begins to flow, the long fibers may flow along with the second matrix material. A corresponding distribution of the long fibers in the second matrix material may therefore be ensured during and/or after the flowing. Thus, the fiber composite component to be produced may also comprise a high stiffness and/or dimensional stability at a geometrically complex and/or protruding component areas.

A further advantageous embodiment of the method is characterized in that an extruded reshaping device is used for the extruded reshaping. The extruded reshaping device comprises a first pressing tool and a second pressing tool. The first and the second pressing tool are traversable relatively to each other between a closed position, in which the first and the second pressing tool enclose a receiving space, and an open position, in which the receiving space is opened to the surrounding. For the extruded reshaping it is at first provided that the pressing tools are traversed into the open position. Furthermore, for the extruded reshaping it is preferred that the semi-finished composite product is introduced into the receiving space. At last, for the extruded reshaping it can be provided, that the pressing tools are traversed into the closed position such that the semi-finished composite product experiences a processual pressure, wherein the first and/or the second semi-finished product are heated such that the semi-finished composite product experience the process temperature such that the fiber composite component develops from the semi-finished composite product.

During the extruded reshaping with the extruded reshaping device it is preferred that the pressing tools stamp an outer shape on the semi-finished composite product which corresponds to the desired outer shape of the fiber composite product to be produced. In doing so, a deformation, particularly a bending and/or a stretching, of the core layer and the first semi-finished product may occur. Since the first and/or the second pressing tool are heated, the semi-finished composite product, and in particular the corresponding first molding compound, experiences the process temperature. Thus, during the extruded reshaping with the extruded reshaping device a flowing of the second matrix materials of the first molding compound may happen. This ensures, that the semi-finished composite product completely fills the receiving space. Particularly geometrically complex outer contours for the semi-finished composite product which are predetermined by the receiving space may be filled with the second matrix material of the first molding compound.

In the following, reference is made to a first pressing tool and a second pressing tool. Those pressing tools may be a part of the extruded reshaping device. That extruded reshaping device is preferably a extruded reshaping device as explained above. Generally, the extruded reshaping device may be carried out as another extruded reshaping device.

A preferable embodiment of the method is characterized in that for the extruded reshaping a first pressing tool and a second pressing tool are used, wherein the first pressing tool comprises a first pressing face, which is configured to shape the front face of a fiber composite component, and wherein the first pressing face comprises a first molding section protruding into the first pressing tool, such that the first molding section forms a first cavity being open to the first pressing face, and wherein in sub-step iii), the first molding compound is applied to the first semi-finished product such that the first molding compound flows into and fills out the first cavity during the extruded reshaping. The first pressing face of the first pressing tool may therefore limit a portion of the receiving space mentioned above. Furthermore, the first pressing tool comprises a first molding section, which preferably faces away from the receiving space and protrudes into the first pressing tool. The first molding section therefore forms a first cavity which opens towards the first pressing face. The first cavity can form a part of the receiving space.

The first molding section may comprise a contour being configured to shape a component section which protrudes over the outer face of the fiber composite component to be produced. Alternatively, or additionally, the shape and contour of the first molding section can be configured to stamp a geometrically complex contour on a section of the fiber composite component, the section protruding over the outer face of the fiber composite component. During the extruded reshaping it has been found in practice that during the extruded reshaping the second matrix material of the first molding compound is preferably suited to fill out the first cavity. The long fibers being embedded into the second matrix material allow that the second matrix material flows into the first cavity. In order to ensure this in a particularly effective manner, it is provided that the first molding compound is applied on to the first semi-finished product such that the first molding compound indeed flows into and fills out the first cavity during the extruded reshaping. Therefore, it can be preferred that the arrangement of the first molding compound on the first semi-finished product is performed such that the first molding compound is arranged opposite to the first cavity after introducing the semi-finished composite product in the receiving space. When the pressing tools are then traversed into the closed position, wherein at least one of the pressing tools is heated, a flowing of the second matrix material or the first molding compound, respectively, will occur. The first molding compound is arranged opposite the first cavity, as discussed above, such that it can be ensured that at least substantially only the first molding compound flows into and fills out the first cavity. During the extruded reshaping a hardening of the semi-finished composite product will happen such that also the first molding compound correspondingly hardens in the first cavity. This ensures that the fiber composite component produced is formed by the hardened first molding compound in the corresponding area. The respective advantages have been discussed above such that reference is made to them.

Furthermore it is preferred that the semi-finished composite product is arranged on the second pressing tool while it is introduced into the receiving space. This enables a preferably advantageous and/or exact positioning of the semi-finished composite product in the receiving space. This advantageously ensures that the first molding compound is arranged opposite to the first cavity.

A first advantageous embodiment of the method is characterized in that the first deposit area is predetermined such that during the extruded reshaping only the first molding compound flows into and fills out first cavity. In practice, the outer contour of the fiber composite component to be produced is known. Correspondingly, therefore, a molding contour of the first pressing face of the first pressing tool is known. From that knowledge it can be concluded to the position and/or the area of the first molding section. Based on that information it is therefore possible to determine the first deposit area. The first deposit area may therefore be predetermined such that the first molding compound is arranged opposite to the first molding section and/or opposite to the first cavity after introducing the semi-finished composite product into the receiving space. Due to the predetermined choice and/or determination of the deposit area, it can be ensured that during the extruded reshaping only the first molding compound flows into the first cavity.

A further advantageous embodiment of the method is characterized in that the amount of the first molding compound is predetermined and/or chosen such that during the extruded reshaping only the first molding compound flows into and only fills out the first cavity. The first cavity may comprise a specific volume. Corresponding to that volume the amount of the molding compound can be predetermined and/or chosen such that the first molding compound is sufficient for filling the volume being provided by of the first cavity. It has been turned out to be advantageous if the amount of the first molding compound is chosen such that it is bigger than the volume being provided by the first cavity. This allows to also cover edge areas of the first pressing face being adjacent to the first molding section with the first molding compound during the extruded reshaping. This ensures a particularly smooth transition between the first molding compound and the first semi-finished product during the extruded reshaping.

A further advantageous embodiment of the method is characterized in such that the first molding section is configured to shape a component section which protrudes over the front face of the fiber composite component. As discussed above, it is preferred that the first molding compound completely flows into the first cavity being provided by the first molding section and completely fills it out. Therefore, the protruding component sections of the fiber composite component may be designed by the hardened molding compound in the area of the first cavity. The long fibers being embedded in the second matrix material of the first molding compound flow with the first molding compound into the first cavity during the extruded reshaping. Thus, it can be ensured that the protruding component section of the fiber composite component is also fiber-reinforced, namely by the long fibers. Within the extruded reshaping the second duroplastic matrix material of the molding compound cross-links with the first duroplastic matrix material of the first semi-finished product such that a particularly ensured tensile strength and/or dimensionally stable connection between the protruding composite section of the fiber composite component and the adjacent sections of the fiber composite components may be formed. This can effectively prevent that the protruding component sections of the fiber composite component unintentionally breaks and/or is unintentionally damaged within higher loads.

A further advantageous embodiment of the method is characterized in that the core layer is a plate shaped and/or alveolar, in particular honeycomb-shaped, material layer. That material layer comprises cavities. In particular, if the material layer is alveolar and/or honeycomb shaped, the cavities can be designed by the alveolar interior spaces. For forming the alveolar and/or the honeycomb shaped in the material layer, the material layer may comprise separating walls. Those separating walls may be made from a fiber-reinforced material, in particular from a fiber-reinforced duroplastic material. Generally, further materials for forming said machine layer are also possible.

A further advantageous embodiment of the method is characterized in that the core layer is formed by a solid foam. That solid foam may comprise open-pored and/or closed-pored cavities which designed the cavities of the core layer.

A further advantageous embodiment of the method is characterized in that step a) for producing the semi-finished composite product further comprises the following sub-step: covering a second outer face of the core layer being opposite to the first outer face of the core layer with a second, layer-shaped semi-finished product, that comprises continuous fibers being impregnated with a third duroplastic matrix material. It is preferably provided, that the third duroplastic matrix material corresponds to the first duroplastic matrix material. Furthermore, the continuous fibers can be designed as it is discussed for the first semi-finished product. For the matrix material and/or the continuous fibers reference is preferably made to the previous advantageous embodiments, the preferred features and/or the effects in an analogous manner. Furthermore, it can be provided, that the covering of the second outer face of the core layer with the second semi-finished product is performed prior to, after and/or at least partially at the same time with the covering of the first outer face of the core layer with a first semi-finished product. Therefore, it can be provided, that at first one outer face of the core layer is covered with the respective semi-finished product and after that the other outer face of the core layer is covered with the respective semi-finished product. Furthermore, it can be provided, that a covering of both outer faces with the respective semi-finished product is performed at least in part at the same time. Furthermore, it is preferred that the advantageous embodiments, preferred features and/ or effects being explained in connection with a first semi-finished product may apply in an analogous manner to the second semi-finished product.

A preferred embodiment of the method is characterized in such that the second semi-finished product corresponds to the first semi-finished product. Therefore, the core layer may be covered at each opposite outer face, thus at the first outer face and the second outer face, with the same semi-finished product. At the first outer face the semi-finished product is then called the first semi-finished product and at the second outer face of the core layer, the semi-finished product is then called second semi-finished product. Reference is made to the advantageous embodiments, preferred features and/or effects as being explained before for the first semi-finished product in an analogous manner.

A further advantageous embodiment of the method is characterized in that step a) for producing a composite component further comprises the following sub-step: applying a second molding compound to a second predetermined deposit area of a front face of a second semi-finished product which faces away from the core layer, wherein the second molding compound comprises a fourth, long-fiber-reinforced duroplastic matrix material and wherein the third and fourth matrix material are configured such that the flowability of the fourth matrix material during the extruded reshaping is higher than the flowability of the third matrix material. Concerning the second molding compound and the corresponding fourth matrix material reference is made to the previous preferred embodiments, advantageous features and/or effects in an analogous manner as it has been explained for the first molding compound or the second matrix material, respectively. Thus, the second molding compound can be configured in an analogous manner as the first molding compound and/or can correspond to it. Therefore, it is possible that a molding compound is arranged at each deposit area of the opposite outer faces of the semi-finished composite product, the outer faces each being in contact with a respective semi-finished product. Particularly with reference to the extruded reshaping, analogous advantages and/or effects to the corporation of the second semi-finished product with the second molding compound arise, as being explained in the context of the first molding compound and the first semi-finished product. Reference is made to the respective explanations in a preferably analogous manner.

A further advantageous embodiment of the method is characterized in that step a) for producing the semi-finished composite product further comprises the sub-step: applying a third molding compound to at least one partial section of an circumferential edge of the core layer, wherein the third molding compound comprises a fifth, long-fiber-reinforced duroplastic matrix material, wherein the fifth matrix material is configured such that the flowability of the fifth matrix material is higher than the flowability of the first and/or third matrix material during the extruded reshaping. It is particularly preferred, that the fifth matrix material corresponds to the second matrix material of the first molding compound and/or the fourth matrix material of the second molding compound. Therefore, it can be provided that the matrix material of the first molding compound also may be used for the second molding compound and/or the third molding compound. For the third molding compound reference is made in an analogous manner to the preferred embodiments, advantageous the features and/or effects as being explained for the first molding compound. Advantageously, it can be provided that the first matrix material of the first semi-finished product, the third matrix material of the second semi-finished product as well as the fifth matrix material of the third molding compound are configured such that the flowability of the fifth matrix material of the third molding compound is higher than the flowability of the first matrix material of the first semi-finished product and/or the third matrix material of the second semi-finished product during the extruded reshaping. During the extruded reshaping the third molding compound may therefore flow in an analogous manner as the first and/or second molding compound. However, in doing so it is preferred that the third molding compound is arranged on a circumferential edge of the core layer. The third molding compound can therefore be distributed on an edge of the core layer during the extruded reshaping such that at least a region of the edge of the core layer is covered by the fifth matrix material. When the semi-finished composite product hardens, the fifth matrix material can harden at the edge of the core layer such that at least a part of the edge of the core layer is protected by the hardened fifth matrix material. Preferably, the third molding compound is applied to the complete circumferential edge of the core layer. In that case, the hardened first molding compound may cover and/or effectively protect the complete edge of the core layer after the extruded reshaping. That protection can particularly prevent the entry of gases and/or liquids into the core layer. Furthermore, the hardened third molding compound may be configured to protect the core layer from outer, mechanical impacts.

A further advantageous embodiment of the method is characterized in that the second molding compound corresponds to the first molding compound and/or that the third molding compound corresponds to the first molding compound. Thus, it can be ensured in a very simple manner, that during the extruded reshaping at the, particularly predetermined, operating temperature the molding compound only or at first flow or the matrix material of the molding compounds only or at first flows, respectively, in particular before the matrix material of the first and/or the second semi-finished product begins to flow.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and using modalities of the present subject matter arise from the following description of the embodiments and the figures. A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
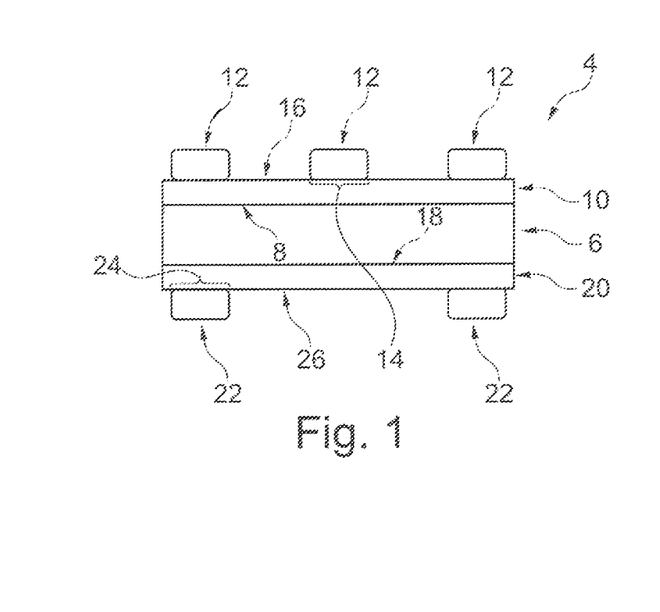
FIG. 1 shows the first advantageous embodiment of the semi-finished composite product in a schematic cross-sectional view.

The inventive method relates to the production of a fiber composite component 2. In doing so, the method comprises two main steps a) and b). According to the first main step a) a production of a semi-finished composite product 4 is provided. In FIG. 1, an exemplary embodiment of the semi-finished composite product 4 is shown in a schematic cross-sectional view. The production of a semi-finished composite product 4 according to main step a) comprises at least the sub-steps i) to iii) which are explained in the following.

According to sub-step i) at first, the provisioning of a core layer 6 is provided. The core layer 6 comprises a plurality of cavities. Preferably, the core layer 6 is plate-shaped. The core layer 6 may be made from a solid foam or from an alveolar material. Thus, the core layer 6 may for example be performed by a so-called honeycomb structure.

According to a further sub-step ii), the covering of the first outer face 8 of the core layer 6 with a first semi-finished product 10 is provided. The first semi-finished product 10 is layer-shaped. Preferably, the first outer face 8 of the core layer 6 may completely cover the first semi-finished product 10. Furthermore, it is provided, that the first semi-finished product 10 is formed by continuous fibers being pre-impregnated with a first duroplastic matrix material. The first semi-finished product 10 may therefore form a so-called prepreg. The continuous fibers of the first semi-finished product 10 may extend for example over the total width and/or the total length of the core layer 6. A corresponding manner may be provided if the continuous fibers are aligned in another manner. The continuous fibers may for example be completely designed in a diagonal extension which is inclined to the longitudinal extension and/or the traverse extension of the core layer 6. The first duroplastic matrix material with which the continuous fibers are pre-impregnated may be called the first matrix material. The first matrix material of the first semi-finished product is at first not completely hardened and/or not completely cross-linked, when the first outer face 8 of the core layer 6 is covered with the first semi-finished product 10.

According to a further sub-step iii) an application of a first molding compound 12 on a first predetermined deposit area 14 of a front face 16 of the first semi-finished product 10 is provided. The front face 16 faces away from the core layer 6. Thus, the first molding compound 12 may be applied on the outer face of the first semi-finished product 10. The first deposit area 14 preferably forms only a part of the surface of the front face 16. The first molding compound 12 is preferably formed by a second long-fiber-reinforced duroplastic matrix material. For that, long fibers may be embedded into the duroplastic matrix material as such. Furthermore, it may be provided, that the duroplastic matrix material as such is not completely cross-linked and/or completely hardened. Therefore, the first molding compound 12 may be configured to be pasty. The application may for example comprise a sputtering and/or laying down of the first molding compound 12.

As seen from FIG. 1, it is preferred, that not only a first predetermined deposit area 14 is covered with a first molding compound 12. It can rather be provided that at several first predetermined deposit areas 14 a respective first molding compound 12 is applied. The front face 16 of the first semi-finished product 10 may further be covered at different first deposit areas 14 with a respective first molding compound 12. The method may therefore correspondingly be configured such that several first molding compounds 12 are applied on a respective first predetermined deposit area 14 of the front face 16 of the first semi-finished product 10. For each of the first molding compounds 12 reference is made to the previous explanations in an analogous manner. Furthermore, it is noted that in the following reference is made to an applying of the first molding compound 12 for an easier explanation. It is further noted that each of the first molding compounds 12 and/or the corresponding application for each of the first molding compounds 12 may be configured and/or designed in an analogous manner.

For main step a) a further sub-step ii.1) may be provided, namely a covering of a second outer face 18 of the core layer 6 with a second semi-finished product 20, the second outer face 10 being opposite to the first outer face 8 of the core layer 6. Preferably, the second outer face 18 of the core layer 6 is completely covered with the second semi-finished product 20. The second semi-finished product 20 is also preferably configured to be layer-shaped. The second semi-finished product 20 is preferably made from continuous fibers being pre-impregnated by a third duroplastic matrix material. The second semi-finished product 20 may therefore also be configured to be a so-called prepreg. Continuous fibers of the second semi-finished product 20 may extend for example over the total width and/or the total length of the core layer 6. A corresponding manner may be provided, if the continuous fibers are aligned in another manner. The continuous fibers may for example be completely designed in a diagonal extension which is inclined to the longitudinal extension and/or the traverse extension of the core layer 6. The third duroplastic matrix material with which the continuous fibers pre-impregnated may be called the third matrix material. The third matrix material of the second semi-finished product is at first not completely hardened and/or not completely cross-linked, when the second outer face 18 of the core layer 6 is covered with the second semi-finished product 20.

The first semi-finished product 10 and the second semi-finished product 20 may be applied after each other on the respective outer face 8, 18 of the core layer 6. The second semi-finished product 20 may be applied before or after the first semi-finished product 10 to the respective outer face 8, 18 of the core layer 6. Alternatively, it can be provided, that the first and the second semi-finished product 10, 20 are applied at least partially at the same time to the respective outer face 8, 18 of the core layer 6.

The covering of the outer face 8, 18 of the core layer 6 with the first semi-finished product 10 or the second semi-finished product 20, respectively, preferably means a laying down of the respective semi-finished product 10, 20. Furthermore, it can be preferred that the second semi-finished product 20 corresponds to the first semi-finished product 10.

For the first semi-finished product 10 and the second semi-finished product 20, the same semi-finished product may therefore be used. If the opposite outer faces 8, 18 of the core layer 6 are covered with the respective semi-finished product 10, 20, a layer arrangement, in particular a sandwich layer arrangement may be developed.

Furthermore, main step a) of the method preferably at comprises a further sub-step ii.2), namely the application of a second molding compound 22 of a second, predetermined deposit area 24 of a front face 26 of the second semi-finished product 20. The front face 26 of the second semi-finished product 20 faces away from the core layer 6. Thus, the second molding compound 22 may be applied to the outer face of the second semi-finished product 20 in the region of the second predetermined deposit area 24. The second molding compound 22 is preferably formed by a fourth long-fiber-reinforced duroplastic matrix material. The long fibers may be embedded in particular quasi-isotropically distributed, in the duroplastic matrix material as such. It is further preferred that the second molding compound 22 corresponds to the first molding compound 12. Furthermore, it can be provided that the duroplastic matrix material as such is not completely cross-linked and/or not completely hardened. Thus, the second molding compound 22 may be configured to be pasty. The applying may for example comprise a sputtering and/or a laying down of the second molding compound 24.

As can be seen from FIG. 1, it is preferred that not only a second preferred element deposit area 24 is covered with a second molding compound 22. Furthermore, it can be provided that a second molding compound 22 is applied to several second predetermined deposit areas 24. The front face 26 of the second semi-finished product 20 may therefore covered with the second molding compound 22 at different second deposit areas 24. The method may correspondingly be configured such that several second molding compound 22 may be applied to respective second predetermined deposit areas 24 of the front face 26 of the second semi-finished product 20. For each of the second molding compounds 22 reference is made to the previous explanation in an analogous manner. Furthermore, it is noted that in the following it is referred to an application of a second molding compound 22 for a simpler explanation. Already here it is noted that each of the second molding compounds 22 and/or the respective application for each of the second molding compounds 22 are configured and/or may be configured in an analogous manner.

For the production of the semi-finished composite product 4 according to main step a) it may be provided that at first a core layer 6 is provided which then is covered with the layer-shaped semi-finished product 10, 20 on its outer faces 8, 18, the semi-finished product 10, 20 being formed by continuous fibers which are pre-impregnated by a duroplastic matrix material, wherein after that the application of a molding compound on the semi-finished products 10, 20 is performed in predetermined deposit areas 14, 24 of the corresponding front face of the semi-finished product 10, 20. The molding compound 12, 22 are each formed by long-fiber-reinforced duroplastic matrix material.

Figure 2:
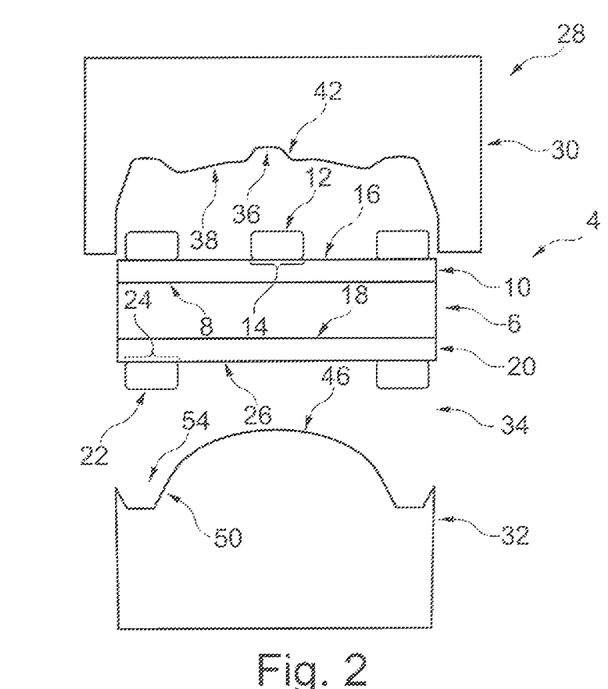
FIG. 2 shows an advantageous embodiment of an opened pressing device in a schematic cross-sectional view.

According to a further main step b) of the method, an extruded reshaping of the previously produced semi-finished composite product 4 to a fiber composite component 2 is provided. The extruded reshaping is preferably performed with a extruded reshaping device 28, which is exemplary shown in a schematic cross-sectional view in FIG. 2. The extruded reshaping device 28 comprises a first pressing tool 30 and a second pressing tool 32. The pressing tools 30, 32 are traversable relative to each other between a closed position, in which the pressing tools 30, 32 enclose a receiving space 34, and an open position, in which the receiving space 34 is open to the surrounding. In FIG. 2, the extruded reshaping device 28 is shown wherein the pressing tools 30, 32 are in the opened position. For carrying out the extruded reshaping the pressing tools 30, 32 are moved into the opened position first. Then, the semi-finished composite product 4 is introduced into the receiving space 34. During the introduction, the semi-finished composite product 4 may be laid down on the second pressing tool 32. Preferably, the second pressing tool 32 is designed as a mold. Furthermore, it can be provided that the first pressing tool 30 is designed as a stamp.

After inserting the semi-finished composite product 4 into the receiving space 34 the pressing tools 30, 32 are traversed into the closed position such that the semi-finished composite product 4 experiences a, particularly predetermined, processing pressure. In doing so, the first pressing tool 30 and/or the second pressing tool 32 are heated such that the semi-finished composite product 4 also experiences a, particularly predetermined, processing temperature such that the fiber composite component 2 develops from the semi-finished composite product 4.

Figure 3:
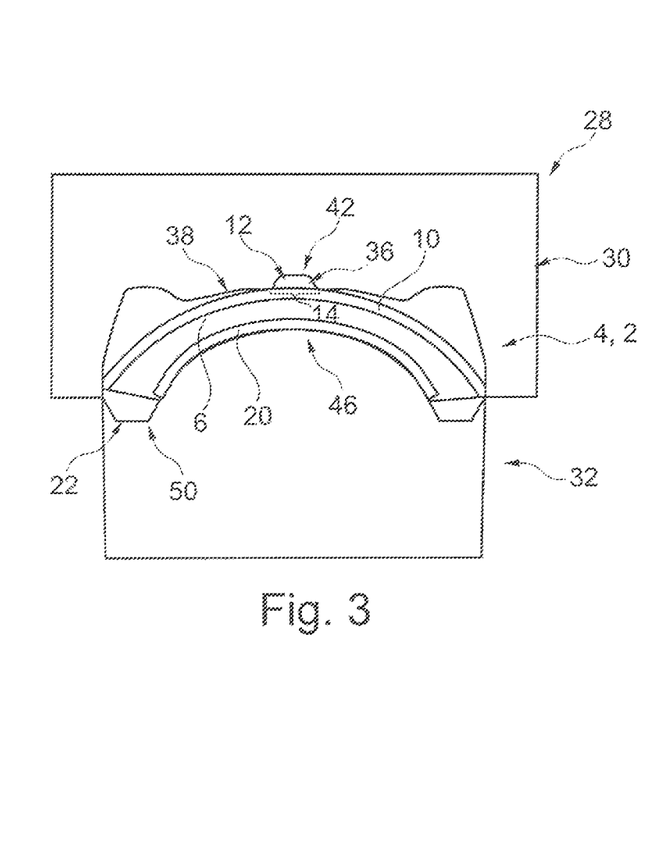
FIG. 3 shows an advantageous embodiment of a close pressing device in a schematic cross-sectional view.
Figure 4:
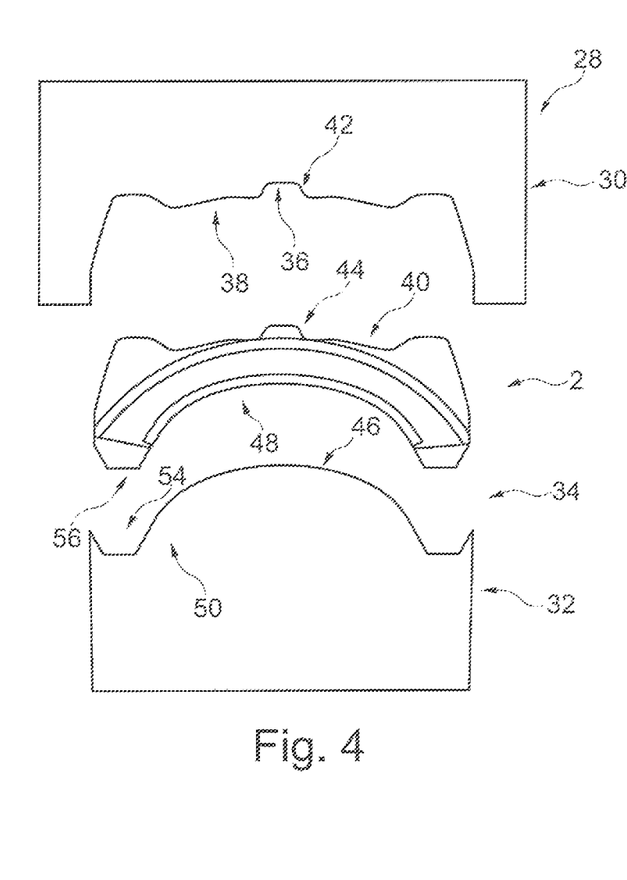
FIG. 4 shows a further advantageous embodiment of an opened pressing device in a schematic cross-sectional view.

FIG. 3 shows an extruded reshaping device 28 with the corresponding pressing tools 30, 32 in a closed position in a schematic cross-sectional view. FIG. 4 shows the extruded reshaping device 28 with the corresponding pressing tools 30, 32 in an open position, after the extruded reshaping is terminated such that the fiber composite component 2 may be removed from the receiving space 34.

As explained above, during the extruded reshaping an operating temperature and/or an operating pressure may influence the semi-finished composite product 4. Although the following explanations are based on the first semi-finished product 10 and the first molding compound 12, analogous explanations may apply for the second semi-finished product 20 and the second molding compound 22. Particularly during the extruded reshaping, it is provided that the first matrix material of the first semi-finished product 10 and the second matrix material of the first molding compound 12 are configured such that the flowability of the second matrix material of the first molding compound 12 comprises a higher flowability than the first matrix material of the first semi-finished product 10 during the extruded reshaping. It is furthermore exemplary provided, that due to the influence of the operating temperature during the extruded reshaping the second matrix material of the first molding compound 12 reaches a flowable state before the first matrix material of the first semi-finished product 10. The flowability of the second matrix material of the first molding compound 12 may therefore be defined by the period within which the second matrix material of the first molding compound 12 is flowable due to the influence of the operating temperature and/or the operating pressure during the extruded reshaping. A corresponding manner may apply to the first matrix material of the first semi-finished product 10. Thus, the flowability of the first matrix material of the first semi-finished product 10 may be defined by the period within which the first matrix material of the first semi-finished product 10 is flowable due to the influence of the operating temperature and/or the operating pressure during the extruded reshaping. Since it is preferred that the second matrix material of the first molding compound 12 achieves the flowability or a flowable state, respectively, before the first matrix material of the first semi-finished product 10, the respective period of the second matrix material of the first molding compound 12 in a flowable state may be higher. When the pressing tools 30, 32 are traversed into the closed position, the second matrix material of the first molding compound 12 will first start to flow. This provides the advantage that the second matrix material of the first molding compound 12 flows at least in a cavity 36 which is provided by the first pressing tool 30. The first pressing tool 30 may comprise a first pressing face 38 for that, the pressing face 38 being configured to shape a front face 40 of the fiber composite component 2. The first pressing face 38 of the first pressing tool 30 may therefore be configured to limit the receiving space 34. Furthermore, the first pressing face 38 may comprise a first molding section 42 protruding into the tool 30, such that the first molding section 42 forms the first cavity 36, the cavity 36 being open to the first pressing face 38. The first cavity may be configured such that a component section 44 is stamped and/or shaped, the component section 44 protruding over the front face 40 of the fiber composite component 2. That protruding component section 44 of the fiber composite component 2 may be called salient component section 44 of the fiber composite component 2.

In practice, it has been found to be advantageous if the protruding section 44 of the fiber composite component 2 is not made of the continuous fibers being pre-impregnated by the matrix material. It rather has turned out advantageous if such a protruding component section 44 of a fiber composite component 2 is made of a long-fiber-reinforced matrix material. The reason is that during an extruded reshaping it is preferred that the continuous fibers being pre-impregnated with matrix material and being laid down on the core layer 6 remain at least substantially or closely on the same position of the core layer 6. This may be advantageously achieved if during the extruded reshaping first the first molding compound 12 becomes flowable and/or is transitioned to a flowable state. Because of that, the long-fiber-reinforced duroplastic matrix material of the first molding compound may flow in and fill out the cavity 36. Therefore, it is preferred that in the sub-step i) the first molding compound 12 is applied such to the first semi-finished product 10 that the first molding compound 12 flows into and fills out the first cavity 36 during the extruded reshaping. If the cavity 36 is filled by the molding compound 12 it is effectively prevented that the first semi-finished product 10 can flow into the cavity 36. The first semi-finished product 10 remains as desired at least substantially on the outer face 8 of the layer 6 during the extruded reshaping.

To further prevent that a portion of the first semi-finished product 10 flows into the cavity 36 during the extruded reshaping, it has been found to be advantageous, that the amount of the molding compound 12 is chosen such that during the extruded reshaping only the first molding compound 12 flows into and fills out the first cavity 36. The amount of the first molding compound 12 may therefore advantageously be chosen such that the amount at least corresponds to the volume being provided by the first cavity 36. In particular, it is preferred that the amount of the first molding compound 12 is chosen such that its volume is bigger than the corresponding volume of the first cavities 36. As such, it can effectively be ensured that during the extruded reshaping only the molded compound 12 flows into the cavity 36 and not the first semi-finished product 10.

For producing the fiber composite component 2 at least the interior or contour of the first pressing face 38 of the first molding tool 30 is known. In order to ensure that only the first molding compound 12 flows into the first cavity 36 during the extruded reshaping, it may be provided that the first deposit area 14 is predetermined such that during the extruded reshaping only the first molding compound 12 flows in and fills out the first cavity. The first deposit area 14 may therefore be predetermined such that the first molding compound 12 is arranged opposite to the first cavity 36 after introducing the semi-finished composite product 4 in the receiving space 34. In this manner, it may be ensured in a predetermined manner that the first molding compound 12 flows into the first cavity 36. Furthermore, it is preferred that the first molding compound 12 achieves the flowable state before the first semi-finished product 10. If the extruded reshaping is then performed it can be ensured in a predetermined manner that also the first molding compound 12 indeed flows into and fills out the first cavity 36.

As is exemplary shown in FIGS. 1 and 2, it is preferred that the front face 16 of the first semi-finished product 10 is covered with the first molding compound 12 on different deposit areas 14 and/or deposit areas 14 being spaced from each other or that at those locations the first molding compound 12 is applied, respectively. Correspondingly, the first pressing face 38 of the first pressing tool 30 may be configured such that the first pressing face 38 comprises several first molding sections 42 which each protrude into the first pressing tool 30. Each molding section 42 may form a corresponding first cavity 36. Furthermore, it is preferred that each molding section 42 is designed such that each molding section 42 forms a component section 44 protruding over the front face 40 of the fiber composite component 2. Furthermore, for each first molding compound 12 a corresponding first deposit area 14 is provided. Each deposit area 14 may be predetermined such that during an extruded reshaping only the first molding compound 12 being applied in that deposit area 14 flows into and fills out the oppositely arranged first cavity 36. If the first pressing tool 30 therefore comprises several first cavities 36, the application of several first molding compound 12 effectively prevents that during the extruded reshaping the first semi-finished product 10 flows into one of the cavities 36.

Furthermore, it has been discussed above, that the second front face 18 of the core layer 6 is covered with the second semi-finished product 20, wherein the second molding compound 22 may be applied on a predetermined second deposit area 24 of the front face 26 of the second semi-finished product 20. The second molding tool 32 may therefore comprise a second pressing face 46 which is designed in an analogous manner to the first pressing face 38 of the first pressing tool 30. In other words, the second pressing tool 32 may comprise a second pressing face 46 which is configured to shape the back face 48 of the fiber composite component 2. The second pressing face 46 preferably comprises a second molding section 50 protruding into the second pressing tool 32, such that the second molding section 50 forms out a second cavity 54 which is open towards the second pressing face 46. In doing so, it is provided, that the second molding compound 22 is applied to the second semi-finished product 20 such that the second molding compound 22 flows into and fills out the second cavity 54 during the extruded reshaping. The second deposit area 24 may be predetermined such that during the extruded reshaping only the second molding compound 22 flows into and fills out the second cavity 50. The second deposit area 24 may therefore be predetermined such that the second molding compound 22 is arranged opposite to the second cavity 54 after introducing the semi-finished composite product 4 into the receiving space 34. Furthermore, the amount of the second molding compound 22 may be chosen such and/or be predetermined such that during the extruded reshaping only the second molding compound 22 flows into and fills out the second cavity 54. Furthermore, the second molding compound 50 may be designed to form a component section 56 protruding over the back face 48 of the fiber composite component 2. Furthermore, reference is made to the corresponding advantageous embodiments, preferred features and/or effects as they have been explained in the context with a first molding compound 12 and the first pressing tool 30. If the extruded reshaping is performed after the introduction of the semi-finished composite product 4 into the receiving space 34 of the pressing device 28, it can be ensured that the cavities 36, 54 mentioned above are filled out only by the first molding compound 12 or the second molding compound 22, respectively.

With the extruded reshaping, it can further be ensured that also the first matrix material of the first semi-finished product 10 and/or the third matrix material of the second semi-finished product 20 transitions into a deformable and/or flowable state. This allows to provide a particularly simple shaping for the semi-finished product 4 such that the shape which shall be achieved for the fiber composite component 2 to be produced can be achieved. As it is exemplary shown in FIG. 3, the semi-finished composite product 4 being inserted into the receiving space 34 may be influenced by a processing pressure and/or a processing temperature, such that also the core layer 6 as well as the first semi-finished product 10 and/or the second semi-finished product 20 are under an effect of a shape change or that the shape change is forced on them. In doing so, it is preferred that the first semi-finished product 10 and/or the second semi-finished product 20 still cover the first outer face 8 or the oppositely arranged outer face 18, respectively.

The extruded reshaping further ensures that the total matrix material of the semi-finished composite product 4 is completely cross-linked and/or hardened. In that process a cross-linking between the first matrix material of the first semi-finished product 10 and the second matrix material of the first molding compound 12 may occur. Thus, a particularly permanent and/or dimensionally stable connection may develop. Correspondingly it can be provided, that during the extruded reshaping a cross-linking between the third matrix material of the second semi-finished product 20 and the fourth matrix material of the second molding compound 22 develops. Also in that process a correspondingly permanent and/or dimensionally stable connection may develop.

When the extruded reshaping is finished, the pressing tools 30, 32 of the extruded reshaping device 28 may be traversed into the open position such that the produced fiber composite component 2 may be removed from the receiving space 34. This is exemplary shown in FIG. 4. The fiber composite component 2 then comprises the desired outer contour which corresponds to the contour of the receiving space 34. Since the first cavity 36 and/or the second cavity 54 at least in part form out the receiving space it is possible to shape, stamp and/or design corresponding protruding component sections 44, 56. Those protruding component sections 56 are shaped by the hardened second matrix material or the hardened fourth matrix material, respectively. Each of the matrix materials is reinforced by long fibers. This may ensure that also the protruding component sections 44, 56 may be particularly permanent and/or dimensionally stable. Due to the cross-linking mentioned above a particularly stable connection develops at the composite sections of the fiber composite component 2, which is formed out by the hardened first semi-finished product 10 and/or the hardened second semi-finished product 20. The fiber composite component 2 may therefore be designed in the manner of a sandwich component, wherein the outer layers and even the protruding component sections 44, 56 comprise a particularly high stability and/or dimensional stiffness. Those layers are formed out by the hardened semi-finished products 10, 20 and the hardened molding compound 12, 22.

Figure 5:
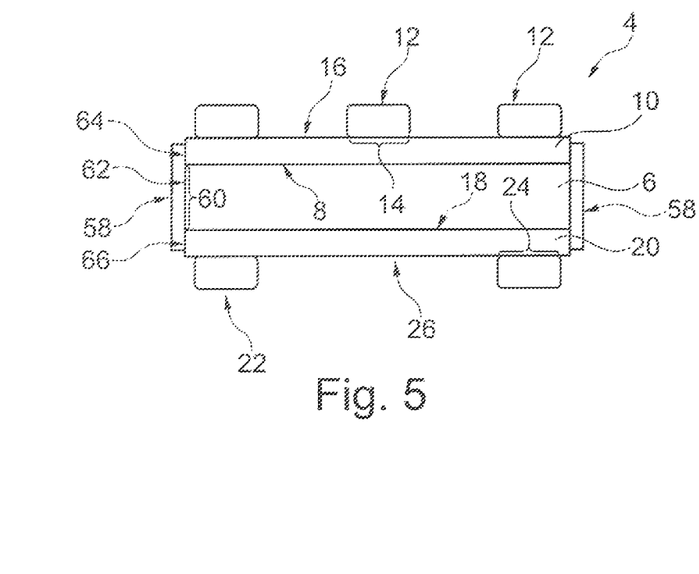
FIG. 5 shows a second advantageous embodiment of the semi-finished composite product in a schematic cross-sectional view.
Figure 6:
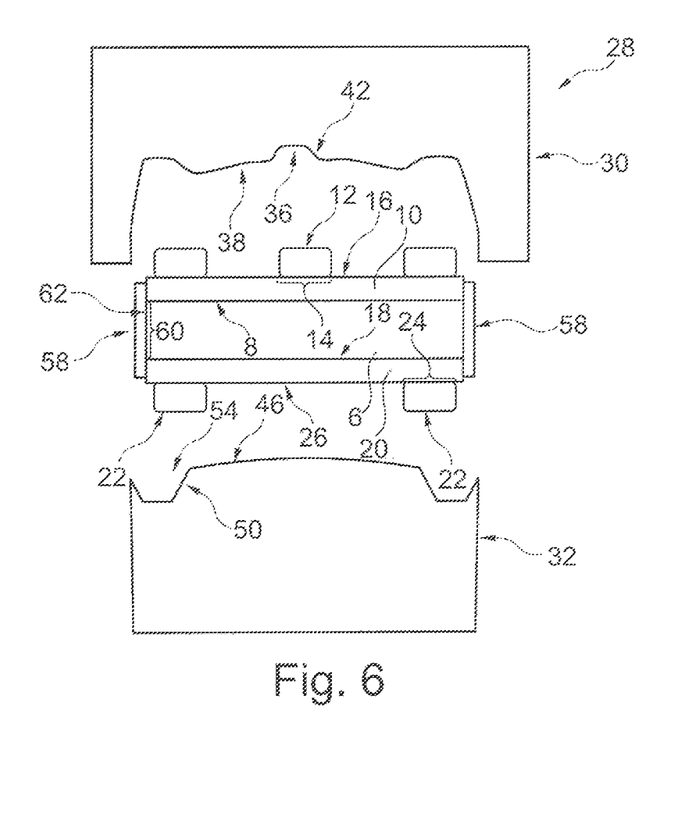
FIG. 6 shows a further advantageous embodiment of an opened pressing device in a schematic cross-sectional view.

FIG. 5 shows a further advantageous embodiment of the semi-finished composite product 4 in a schematic cross-sectional view. The shown semi-finished product 4 at least substantially corresponds to the semi-finished product 4 being shown in the previous figures. Reference is made to the corresponding advantageous embodiments, preferred features and/or effects in an analogous manner. For the semi-finished composite product 4 it is rather provided, that a third molding compound 58 is applied at least to a section segment 60 of the circumferential edge 62 of the core layer 6. In an advantageous embodiment, main step a), namely the production of a semi-finished composite product 4, may therefore comprise the following sub-step: applying the third molding compound 58 at least to a section segment 60 of the circumferential edge 62 of the core layer 6. Preferably, the third molding compound 58 is formed by a fifth long-fiber-reinforced duroplastic matrix material. The first matrix material is preferably configured such that the flowability of the fifth matrix material during the extruded reshaping is higher than the flowability of the first and/or third matrix material. The third molding compound 58 as such may be designed in an analogous manner to the first molding compound 12 or the second molding compound 22. The third molding compound 58 is applied on the edge 62 of the core layer 6. The edge 62 of the core layer 6 may be designed to be circumferential. Correspondingly, also the third molding compound 58 may be applied in a circumferential manner to the edge 62, such that the edge 62 is completely covered by the third molding compound 58. Alternatively, it may be provided, that only a section segment 60 of the circumferential edge 62 is covered by the third molding compound 58. Furthermore, it can be provided, that the circumferential edge 62 is covered by the third molding compound 58 on several section segments 62. The section segments 62 may be spaced to each other in the circumferential direction. Furthermore, it is preferred that the third molding compound 58 at least in part extends over an edge area 64 of the first semi-finished product 10 and/or over and edge area 66 of the second semi-finished product 20. Therefore, the third molding compound 58 may extend from the edge area the first semi-finished product 10 to the edge 62 of the core layer 6 and further to the edge area 66 of the second semi-finished product 20. The third molding compound 58 is formed out by the fifth long-fiber-reinforced duroplastic matrix material. In addition, long fibers may be embedded, particularly quasi-isotopically distributed, into the corresponding duroplastic matrix material as such corresponding to the explanations above. Since the third molding compound 58 is preferably configured as the first molding compound 12, reference is made to the preferred embodiments, advantageous features and/or effects in an analogous manner.

Furthermore, it is preferred that the fifth matrix material of the third molding compound 58 comprises a flowability during the extruded reshaping which is higher than the flowability of the first matrix material of the first semi-finished product 10 and/or higher than the flowability of the third matrix material of the second semi-finished product 20. Analogously to the first molding compound 12 and/or the second molding compound 22, corresponding effects and/or advantages may develop as they have been explained with respect to the first molding compound 12 and/or the second molding compound 22 in relation to the first semi-finished product 10 or the second semi-finished product 20, respectively. Referring to the flowability of the third molding compound 58, reference is made to the previously mentioned preferred embodiments, advantageous features and/or effects, as it has been explained with respect to the first molding compound 12 in relation to the first semi-finished product 10 and/or for the second molding compound 22 in relation to the second semi-finished product 20. During the extruded reshaping, it may happen that the first molding compound 12, the second molding compound 22, and the third molding compound 58 transition into a flowable state before that corresponding flowable state begins for the first matrix material of the first semi-finished product 10 or the third matrix material of the second semi-finished product 20, respectively. This ensures that also the edge area of the fiber composite component 2 to be produced is made of the hardened third molding compound 58 on the determined edge areas. This effectively prevents that liquids, fluids and/or gases enter the core layer 6 via the edge area. The hardened third molding compound 58 may therefore protect the core layer 6 from gases, liquids and/or mechanical impacts.

To produce the fiber composite component 2 from the semi-finished composite product 4 as exemplary shown in FIG. 5, the semi-finished composite product 4 is introduced into the receiving space 34 of the extruded reshaping device 28 as explained above. Then the extruded reshaping occurs in an analogous manner as being explained above. Reference is made to the corresponding preferred embodiments, advantageous features and/or effects in an analogous manner.

Figure 7:
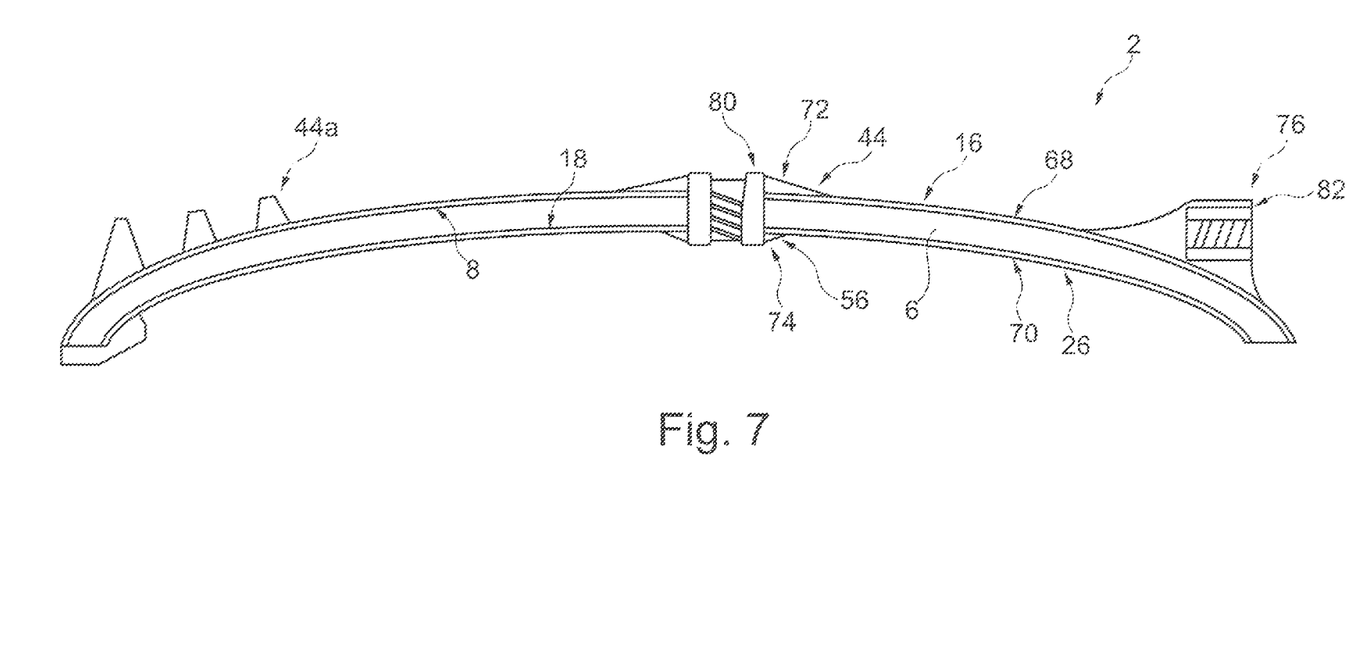
FIG. 7 shows an advantageous embodiment of a fiber composite component in a schematic cross-sectional view.

In an advantageous embodiment of the fiber composite component 2, FIG. 7 shows a schematic cross-sectional view. The fiber composite component 2 comprises a core layer 6. The core layer 6 may be formed as a hardened core layer 6. The first outer face 8 of the core layer 6 is covered with the hardened first semi-finished product 68. The oppositely positioned outer face 18 of the core layer 6 is covered with the hardened second semi-finished product 70. A protruding component section 44 of the fiber composite component 2 is formed on the front face 16 of the hardened first semi-finished product 68 by the hardened first molding compound 72. On the oppositely positioned front face 26 a protruding component section 52 may be provided which is formed by the hardened second molding compound 74. As is shown in FIG. 7, a functional element 80 may extend through the fiber composite component 2. The functional element 80 may also be called as so-called insert. The functional element 80 may extend from the hardened first molding compound 72 to the hardened first semi-finished product 68, the core layer 6, the hardened second semi-finished product 70 as well as through the hardened second molding compound 74. Preferably, the functional element 80 is designed in a manner of a cylindrical hollow body. In general, the functional element 80 may also comprise another shape and/or another function. If the functional element 80 is designed in a manner of a cylindrical hollow body it can comprise a cylindrical interior space which is designed to be open to oppositely arranged faces. Furthermore, the interior wall on the shell of the cylindrical hollow body may comprise an interior thread. Furthermore, it is possible that the functional element 80 does not completely extend to the fiber composite component 2. It can exemplary be provided, that the functional element 80 is only arranged and/or integrated in one of the two hardened molding compounds 72 or 74, respectively. Furthermore, the functional element 80 may also extend into the adjacent hardened semi-finished product 68 or 70, respectively, and/or even into the core layer 6. Thus, a further functional element 82 may for example be arranged in a further hardened first molding compound 76. Then, the functional element 82 may form out a part of the outer face of the hardened further first molding compound 76. To provide the fiber composite component 2 with at least one functional element 80, 82, the method may provide that the production of the semi-finished composite product 4 according to step a) also comprises the insertion of a functional element 80, 82 and at least one molding compound 12, 22, 58 and/or in at least one of the semi-finished products 10, 20 and/or into the core layer 6. Thus, the at least one functional element 80, 82 may form out a component of the semi-finished composite product 4. The semi-finished composite product 4 may therefore be shaped by the extruded reshaping with the said functional element 80, 82 to a fiber composite component 2. Furthermore, FIG. 7 shows further protruding component section 44a. That protruding component section 44a is also formed out by the hardened further first molding compound 12. Reference is made to the corresponding advantages and/or effects as explained above.

Additionally, it is noted that "comprising" does not exclude further elements or steps and that "a" does not exclude a plurality. Furthermore, it is noted that features which are described in relation to one of the embodiments mentioned above may also be combined with further features of further embodiments mentioned above. Reference signs in the claims do not limit the protective scope.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for producing a fiber composite component, the method comprising the steps of:
   a) producing a semi-finished composite product with the sub-steps:
      i) providing a core layer comprising a plurality of cavities;
      ii) covering a first outer face of the core layer with a first layer-shaped semi-finished product, which comprises continuous fibers being pre-impregnated with a first duroplastic matrix material; and
      iii) applying a first molding compound to a first predetermined deposit area of a front face of the first semi-finished product, the front face facing away from the core layer, wherein the first molding compound comprises a second long-fiber-reinforced duroplastic matrix material; and
   b) extruded reshaping of the semi-finished composite product to a fiber composite component, wherein the extruded reshaping is performed at an operating temperature, and wherein the first and the second matrix material are configured such that the flowability of the second matrix material during the extruded reshaping is higher than the flowability of the first matrix material.

2. The method according to claim 1, wherein the operating temperature is higher than a second flow temperature, the second flow temperature defining a flowability of the second matrix material, wherein the first flow temperature defining a flowability of the first matrix material is higher than the second flow temperature of the second matrix material.

3. The method according to claim 1, wherein the second matrix material is configured such that the second matrix material is transitioned during the extruded reshaping within a second transition time from a plastically deformable state into a flowable state, wherein the first matrix material is transitioned during the extruded reshaping within a first transition time from a plastic of the deformable state into a flowable state, and wherein the first transition time is at least 20% longer than the second transition time.

4. The method according to claim 3, wherein the extruded reshaping is formed within a processing time, wherein the processing time is longer than the second transition time and/or shorter than the first transition time.

5. The method according to claim 1, wherein a first pressing tool and a second pressing tool are used for the extruded reshaping, wherein the first pressing tool comprises a first pressing face which is configured to shape a front face of the fiber composite component, wherein the first pressing face comprises a first molding section protruding into the first pressing tool such that the first molding section forms a cavity being open towards the first pressing face, and wherein the first molding compound in a sub-step i) is applied such to the first semi-finished product that the first molding compound flows in and fills out the first cavity during the extruded reshaping in step b).

6. The method according to claim 5, wherein the amount of the first molding compound is chosen such that during the extruded reshaping in step b) only the first molding compound flows into and fills out the first cavity.

7. The method according to claim 5, wherein the first deposit area is predetermined such that during the extruded reshaping in step b) only the first molding compound flows in and fills out the first cavity.

8. The method according to claim 5, wherein the first molding section is configured such that the first molding section shapes a component section protruding over the front face of the fiber composite component.

9. The method according to claim 1, wherein the core layer is made of a plate-shaped and/or alveolar material layer.

10. The method according to claim 9, wherein the core layer is made of a honeycomb-shaped material layer.

11. The method according to claim 1, wherein the core layer is made from a solid foam.

12. The method according to claim 1, wherein step a) further comprises the following sub-step performed after sub-step i):
   ii.1) covering a second outer face of the core layer being oppositely arranged to the first outer face of the core layer with a second layer-shaped semi-finished product comprising continuous fibers which are pre-impregnated with a third duroplastic matrix material.

13. The method according to claim 12, wherein the second layer-shaped semi-finished product corresponds to the first layer-shaped semi-finished product.

14. The method according to claim 12, wherein step a) further comprises the following sub-step performed after sub-step ii.1):
   ii.2) applying a second molding compound to a second predetermined deposit area of a front face of the second semi-finished product the front face facing away from the core layer, wherein the second molding compound comprises a fourth long-fiber-reinforced duroplastic matrix material, wherein the third and the fourth matrix material are configured such that the flowability of the fourth matrix material is higher than the flowability of the third matrix material during the extruded reshaping.

15. The method according to claim 14, wherein step a) further comprises a sub-step being performed after sub-step i):
   ii.3) applying a third molding compound at least to a segment section of a circumferential edge of a core layer, wherein the third molding compound comprises a fifth long-fiber-reinforced duroplastic matrix material, wherein the fifth matrix material is configured such that the flowability of the fifth matrix material is higher than the flowability of the first and/or third matrix material during the extruded reshaping.

16. The method according to claim 14, wherein the second molding compound corresponds to the first molding compound and/or that the third molding compound corresponds to the first molding compound.

* * * * *